(12) United States Patent
Johansson et al.

(10) Patent No.: US 10,313,876 B2
(45) Date of Patent: Jun. 4, 2019

(54) SYSTEM INFORMATION STORAGE AND VALIDITY

(71) Applicant: MEDIATEK INC., Hsinchu (TW)

(72) Inventors: Per Johan Mikael Johansson, Kungsangen (SE); Chia-Chun Hsu, New Taipei (TW); Guan-Yu Lin, Nantou County (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/674,519

(22) Filed: Aug. 11, 2017

(65) Prior Publication Data

US 2018/0049022 A1 Feb. 15, 2018

Related U.S. Application Data

(60) Provisional application No. 62/374,048, filed on Aug. 12, 2016.

(51) Int. Cl.
*H04M 3/00* (2006.01)
*H04W 8/24* (2009.01)
*H04W 24/02* (2009.01)
*H04W 48/16* (2009.01)

(52) U.S. Cl.
CPC ............ *H04W 8/24* (2013.01); *H04W 24/02* (2013.01); *H04W 48/16* (2013.01)

(58) Field of Classification Search
CPC .................................. H04W 8/24; H04W 24/02
USPC ......................................................... 455/418
See application file for complete search history.

(56) References Cited

U.S. PATENT DOCUMENTS

| | | | | |
|---|---|---|---|---|
| 7,444,142 B2 * | 10/2008 | Roberts | ................. | H04W 48/16 455/418 |
| 2006/0166693 A1 * | 7/2006 | Jeong | .................... | H04W 48/16 455/525 |
| 2009/0316603 A1 * | 12/2009 | Amerga | ................ | H04W 48/08 370/254 |
| 2014/0286315 A1 | 9/2014 | Chen et al. | .................. | 370/332 |
| 2014/0293901 A1 * | 10/2014 | Hegde | ................... | H04W 48/16 370/329 |
| 2016/0157287 A1 | 6/2016 | Chae et al. | ................... | 370/329 |
| 2016/0174135 A1 * | 6/2016 | Yan | ....................... | H04W 48/12 455/434 |

* cited by examiner

*Primary Examiner* — William Nealon
(74) *Attorney, Agent, or Firm* — Imperium Patent Works; Zheng Jin (57) ABSTRACT

A method of system information (SI) acquisition with reduced signaling overhead is proposed. To reduce SI broadcast overhead, the quantity of periodic SI broadcast and the frequency of on-demand SI acquisition need to be reduced. To reduce the frequency of on-demand SI acquisition, rather than always re-acquire SI when serving cell changes, UE is enabled to reuse stored SI information elements across different cells. More specifically, a novel concept of SI ID is introduced to be associated with an area that applies the same SI configuration. UE can reuse stored SI information elements if the stored SI information elements are valid based on the SI ID and validity check.

20 Claims, 6 Drawing Sheets

```
UE STORAGE:

SI ID#1      SIB#1  VALUE TAG#1
             SIB#2  VALUE TAG#2
             SIB#3  VALUE TAG#3

SI ID#2      SIB#4  VALUE TAG#4
             SIB#5  VALUE TAG#5
             SIB#6  VALUE TAG#6

NO SI ID     SIB#7  VALUE TAG#7
             SIB#8  VALUE TAG#8
```

SYSTEM INFORMATION STORAGE AND VALIDITY

CROSS REFERENCE TO RELATED APPLICATIONS

This application claims priority under 35 U.S.C. § 119 from U.S. Provisional Application No. 62/374,048, entitled "System Information Storage and Validity," filed on Aug. 12, 2016, the subject matter of which is incorporated herein by reference.

TECHNICAL FIELD

The disclosed embodiments relate generally to system information in mobile communication network, and, more particularly, to functionality for handling system and configuration information storage and validity.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). A serving base station can communicate with a plurality of UEs in a serving cell via broadcasting, e.g., when UEs are in idle mode, or via dedicated unicasting, e.g., when UEs are in connected mode. In cellular networks, each serving cell periodically broadcasts its own system configuration—system information.

System information (SI) is information that is provided to users of a communication interface—user equipments (UEs). SI can include information that is needed before using the communication interface, information that is generally used by many users, and information that is suitable to be broadcast, e.g., used by users that are in idle mode. System information includes but is not limited to information that is provided by base stations or access points of a public land mobile network (PLMN), by transmission points, by beams, by cells, by cell portions, etc. System information could also be provided by other access points or by other UEs. The notation of UE also includes machine to machine communication scenarios, i.e., when there is no human user.

In current art, system information is acquired in each cell, where each cell repeatedly and always broadcasts system information. To work normally, UE should store and apply correct version of SI of its own serving cell. For the same SI type, different cells may have different configuration. In LTE, UE always re-acquire all SI types when it changes serving cell. However, periodic broadcast signaling increases inter-cell interference and thus limit the minimum cell distance and cell density. For high-frequency new systems, the concept of a piece of contiguous coverage is no longer a cell but instead a beam, which has very small coverage area. Periodic broadcasting overhead needs to be transmitted on multiple beam directions, resulting in multiple overhead.

5G new radio (NR) aims to reduce system information broadcast overhead. The potential of saving transmission in a higher frequency system by avoiding SI broadcasting is very large, especially at low traffic hours, when many beams will have zero active users, and the requirement for transmission of SI by broadcast is very low. Solutions to reduce SI broadcast overhead are sought.

SUMMARY

A method of system information (SI) acquisition with reduced signaling overhead is proposed. To reduce SI broadcast overhead, the quantity of periodic SI broadcast and the frequency of on-demand SI acquisition need to be reduced. To reduce the frequency of on-demand SI acquisition, rather than always re-acquire SI when serving cell changes, UE is enabled to reuse stored SI information elements across different cells. More specifically, a novel concept of SI ID is introduced to be associated with an area that applies the same SI configuration. UE can reuse stored SI information elements if the stored SI information elements are valid based on the SI ID and validity check.

In one embodiment, a user equipment (UE) stores one or more sets of system information (SI) information elements in a mobile communication network. Each stored set of SI information elements is associated with a corresponding stored SI ID and one or more value tags. The UE receives an applicable SI ID and one or more value tags associated with a set of required SI information elements from a serving entity. The UE determines whether there is any stored set of SI information elements that is valid for the applicable SI ID. Finally, the UE applies a stored set of SI information elements when the stored set of SI information elements is determined to be valid for the applicable SI ID.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
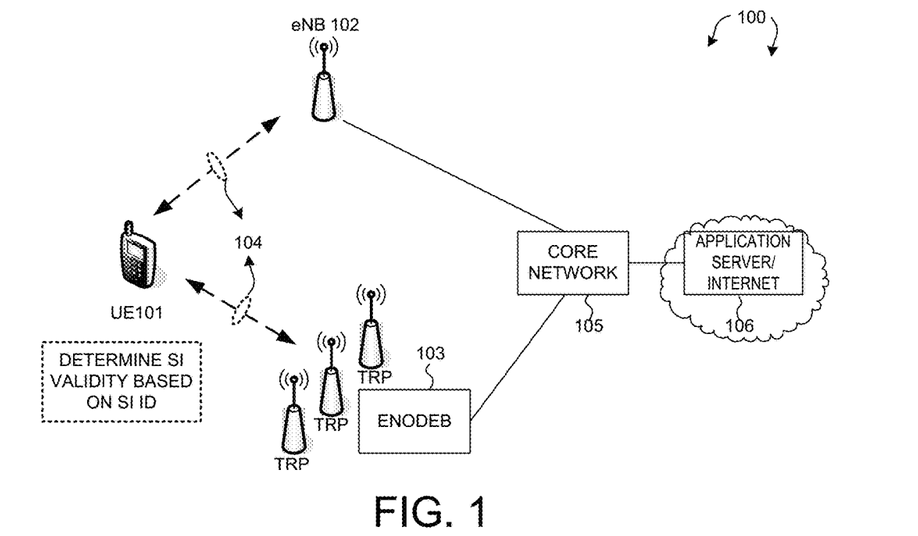
FIG. 1 illustrates a mobile communication network supporting system information acquisition with reduced signaling overhead in accordance with one novel aspect.

FIG. 1 illustrates a mobile communication network supporting system information acquisition with reduced signaling overhead in accordance with one novel aspect. Mobile communication network 100 comprises a user equipment UE 101, a first base station eNodeB 102, a second base station eNodeB 103, and a packet core network (CN) 105. The base stations communicate with each other via the X2 interface, and eNB 102/103 communicates with CN 105 via the S1 interface. UE 101 can access application servers and the Internet 106 over wireless link 104 with eNB 102/103 and CN 105. The eNBs can be implemented in traditional ways as eNB 102, or implemented to include multiple transmission points (TRPs) as eNB 103. The wireless link 104 may be specified as a serving entity including a cell, a cell portion, a TRP, an eNodeB, a sidelink, or a beam in higher frequency systems.

LTE system information (SI) is one of the key aspects of the cellular air interface. SI consists of the Master Information Block (MIB) and a number of System Information Blocks (SIBs) including SIB1 to SIB11. SIB is also referred to as SI information element. MIB carries the most essential system information including the downlink channel bandwidth, the system frame number (SFN), physical HARQ indicator channel (PHICH) configuration, and the number of transmit antenna ports. MIB is sent on the Physical Broadcast Channel (PBCH) and is broadcasted every radio frame with a fixed periodicity of four radio frames. SIBs are sent on the Physical Downlink Shared Channel (PDSCH) through Radio Resource Control (RRC) messages at periodic intervals. For example, SIB1 is carried by "SystemInformationBlockType 1" message. SIB2 and other SIBs are carried by "SystemInformation (SI)" messages. An SI message can contain multiple SIBs. SIB1 carries information regarding whether UE is allowed to access the LTE cell and also defines the scheduling of the other SIBs. SIB2 carries common channels as well as shared channel information and also carries RRC, uplink power control, preamble power ramping etc. SIB3 carries cell re-selection information. SIB4-SIB11 carry other various types of system information.

In current art, system information is acquired in each cell, where each cell repeatedly and always broadcasts system information. To work normally, UE should store and apply correct version of SI of its own serving cell. By checking the value tag, UE checks whether the UE stored SI version is the same as the applicable SI version of the current serving cell. For the same SI type, different cells may have different configuration. In LTE, UE always re-acquire all SI types when it changes serving cell, even if the new serving cell and the old serving cell have the same SI configuration. However, periodic broadcast signaling increases inter-cell interference and thus limit the minimum cell distance and cell density. For high-frequency new systems, the concept of a piece of contiguous coverage is no longer a cell but instead a beam, which has very small coverage area. Periodic broadcasting overhead needs to be transmitted on multiple beam directions, resulting in multiple overhead.

In accordance with one novel aspect, a method of system information (SI) acquisition with reduced signaling overhead is proposed. To reduce SI broadcast overhead, the quantity of periodic SI broadcast and the frequency of on-demand SI acquisition need to be reduced. To reduce the frequency of on-demand SI acquisition, rather than always re-acquire SI when serving cell changes, UE is enabled to reuse stored SI information elements across different cells. More specifically, a novel concept of SI ID is introduced to be associated with an area that applies the same SI configuration. UE can reuse stored SI information elements if the stored SI information elements are valid based on the SI ID and validity check.

In the example of FIG. 1, UE receives and stores one or more sets of SI information elements, each set of SI information elements is associated with a corresponding SI ID. An SI ID is a novel concept introduced to be associated with an area where the same set of SI information elements can be applied within one single SI ID. Based on the received SI ID from the current serving cell, UE can determine whether the stored SI is valid or not for the applicable SI ID. In one example, UE 101 determines that the stored set of SI information elements is valid and can be reused for the current serving cell. In another example, UE 101 determines that no stored set of SI information elements is valid and acquires the required SI information elements via either broadcast reception or on-demand signaling. When the UE moves within an area that is associated with the same SI ID, signaling overhead is reduced because the UE simply reuses the stored SI and does not need to reacquire the SI.

Figure 2:
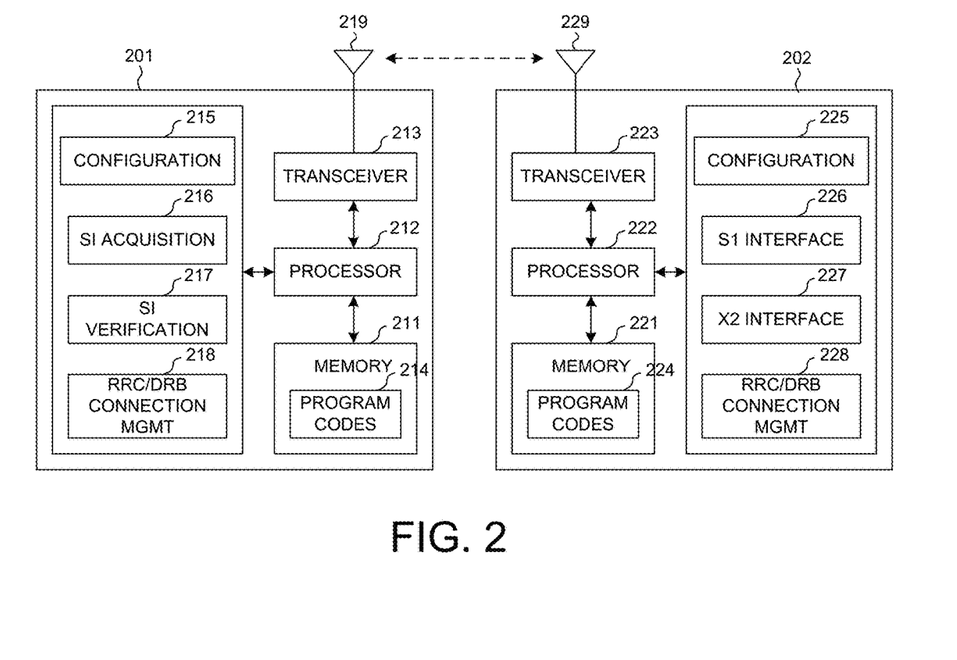
FIG. 2 is a simplified block diagram of a UE and an eNB that carry out certain embodiments of the present invention.

FIG. 2 is a simplified block diagram of a user equipment UE 201 and a base station eNodeB 202 that carry out certain embodiments of the present invention. User equipment UE 201 comprises memory 211 having program codes and data 214, a processor 212, a transceiver 213 coupled to an antenna module 219. RF transceiver module 213, coupled with the antenna, receives RF signals from the antenna, converts them to baseband signals and sends them to processor 212. RF transceiver 213 also converts received baseband signals from the processor, converts them to RF signals, and sends out to antenna 219. Processor 212 processes the received baseband signals and invokes different functional modules and circuits to perform different features and embodiments in UE 201. Memory 211 stores program instructions and data 214 to control the operations of UE 201.

User equipment UE 201 also comprises various function circuits and modules including a configuration circuit 215 that applies SI configuration information, an SI acquisition circuit 216 that performs system information acquisition, an SI verification circuit 217 that checks the validity of stored SI information, and an RRC/DRB connection management and handling circuit 218 that performs RRC connection setup procedure and NAS setup procedure. The different circuits and modules are function circuits and modules that can be configured and implemented by software, firmware, hardware, or any combination thereof. For example, each circuit or module may comprise the processor 212 plus corresponding software codes. The function modules, when executed by the processors (e.g., via executing program codes 214 and 224), allow UE 201 and eNB 202 to perform system acquisition with reduced signaling overhead.

Similarly, base station eNodeB 202 comprises memory 221 having program codes and data 224, a processor 222, a transceiver 223 coupled to an antenna module 229. RF transceiver module 223, coupled with the antenna, receives RF signals from the antenna, converts them to baseband signals and sends them to processor 222. RF transceiver 223 also converts received baseband signals from the processor, converts them to RF signals, and sends out to antenna 229. Processor 222 processes the received baseband signals and invokes different functional modules and circuits to perform different features and embodiments in eNodeB 202. Memory 221 stores program instructions and data 224 to control the operations of eNodeB 202. Base station eNodeB 202 also comprises various function circuits and modules including a configuration module 225 that provides various configuration including applicable SI ID, value tag, and validity timer to UE 201, an S1 interface module 226 that manages communication with an MME in the core network, an X2 interface module 227 that manages communication with other base stations, and an RRC/DRB connection management and handling circuit 228 that performs RRC connection setup and NAS setup procedures and maintains RRC/DRB connection.

Figure 3:
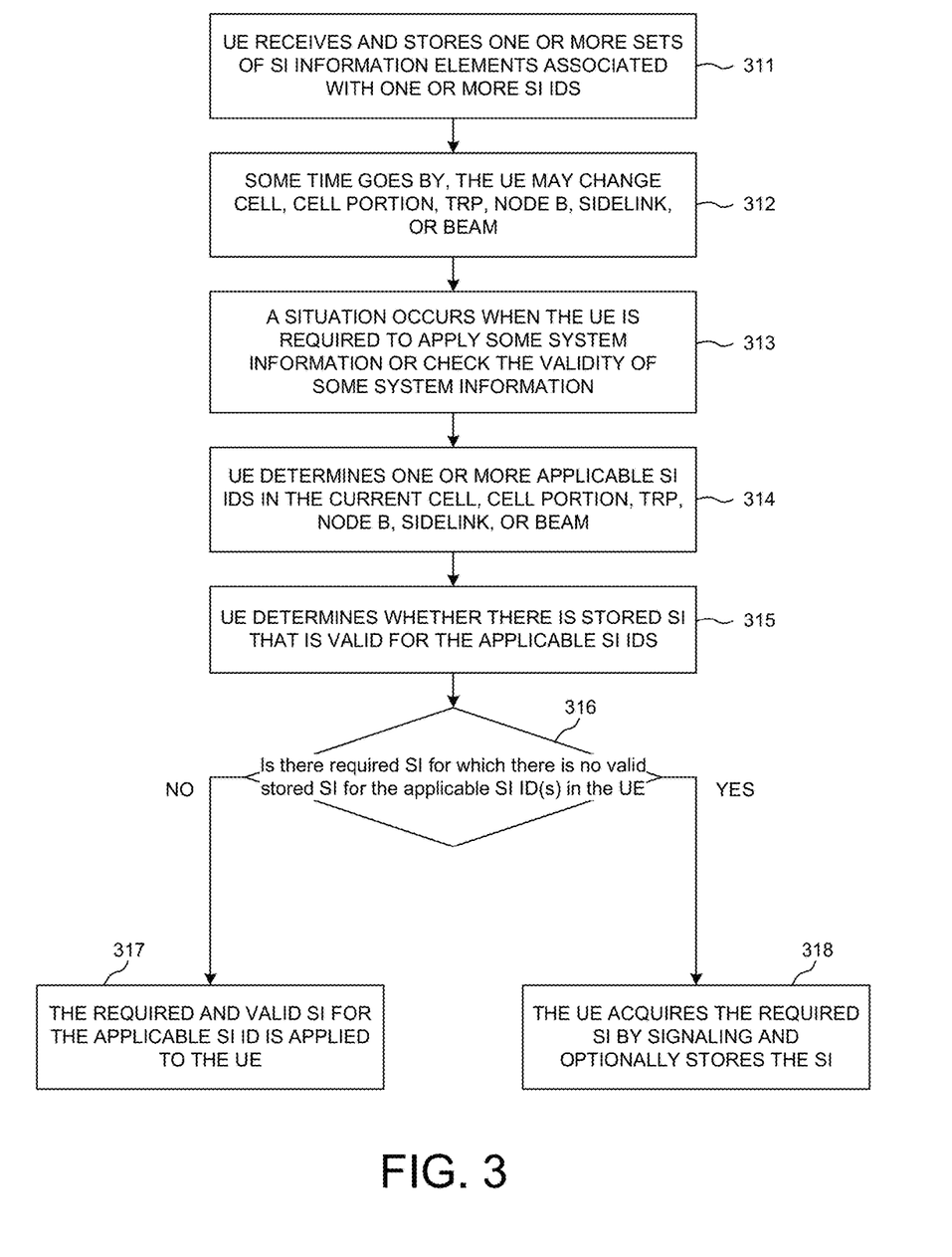
FIG. 3 illustrates a procedure for UE to acquire system information with existing stored system information in accordance with one novel aspect.

FIG. 3 illustrates a procedure for UE to acquire system information with existing stored system information in accordance with one novel aspect. In step 311, a UE receives and stores one or more sets of SI information elements, each set of SI information elements is associated with a corresponding SI ID. In step 312, some time goes by, the UE may change cell, cell portion, TRP, eNodeB, sidelink, or beam. Note that the stored SI may have been provided by another cell, cell portion, TRP, eNodeB, sidelink or beam and the UE may have moved in step 312. In step 313, a situation occurs when the UE is required to apply some system information or check the validity of some system information. Note that the triggering conditions for the UE to check the validity of SI may include a cell change, but are not defined in this invention. In step 314, the UE determines one or more applicable SI IDs in the current serving cell, cell portion, TRP, eNodeB, sidelink, or beam. In step 315, the UE determines whether there is a set of stored SI information elements that is valid for the applicable SI IDs. In step 316, the UE checks whether is there required SI for which there is no valid stored SI for the applicable SI IDs. If the answer to step 316 is no, in step 317, the UE applies the required and valid SI for the applicable SI IDs. If the answer to step 316 is yes, in step 318, the UE acquires the required SI by signaling and optionally stores the SI.

Figure 4:
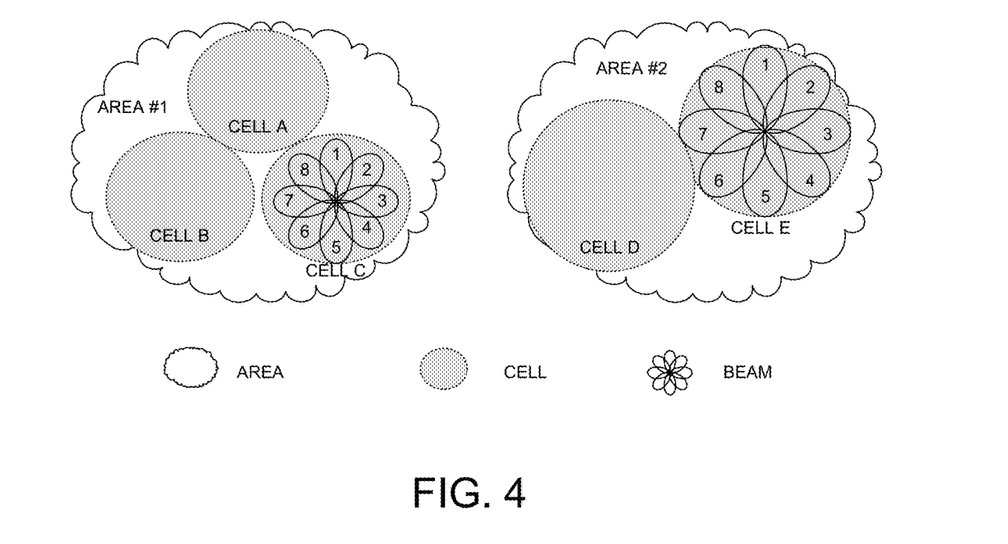
FIG. 4 illustrates a novel concept of system information identity (SI ID) that is associated with a set of SI information elements.

FIG. 4 illustrates a novel concept of system information identity (SI ID) that is associated with a set of SI information elements. The SI ID is intended to be usable in multiple ways, where one way is to associate areas where a set of SI information elements is the same with one single SI ID. As long as a UE moves within the area, the UE can apply stored system information that is associated with the SI ID rather than reacquire the system information. However, when a UE moves into another area with a different SI ID, then the UE needs to reacquire SI that is associated with the new SI ID and apply the reacquired SI.

In the example of FIG. 4, geographic area #1 is associated with a first SI ID#1, and geographic area #2 is associated with a second SI ID#2. Area #1 contains three cells—cell A, cell B, and cell C, and cell C is configured with eight directional beams 1-8. Area #2 contain two cells—cell D and cell E, and cell E is configured with eight directional beams 1-8. Within area #1, the same set of SI information elements are applied across cell A, cell B and cell C, and across beams 1-8 in cell C. When a UE moves within area #1, the UE can reuse the stored SI information elements associated with SI ID#1 without reacquiring the SI. Similarly, within are #2, the same set of SI information elements are applied across cell D and cell E, and across beams 1-8 in cell E. When a UE moves within area #2, the UE can reuse the stored SI information elements associated with SI ID#2 without reacquiring the SI.

Figure 5:
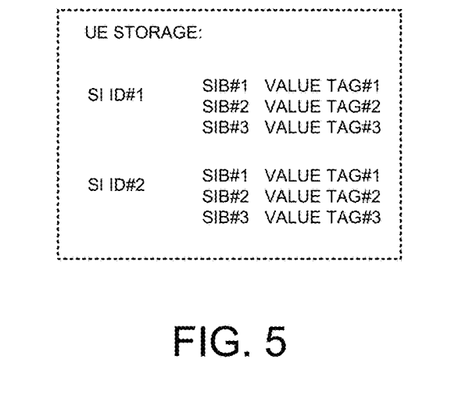
FIG. 5 illustrates a first examples of UE stored system information where different versions of the same system information are stored.

FIG. 5 illustrates a first examples of UE stored system information where different versions of the same system information are stored. Note that UE can receive and store system information for SI IDs that is intended to be applied elsewhere, e.g., when the UE moves to another area. In the example of FIG. 5, the UE can store SI information elements associated with both SI ID#1 and SI ID#2. SI ID#1 is associated with a first area#1 and SI ID#2 is associated with a second area#2. As a result, when the UE moves from area #1 to area #2 or vice versa, the UE can apply the stored SI information elements accordingly without reacquiring the SI.

Another way to use multiple SI IDs is to have different SI IDs for sets of SI information elements that have different applicability areas. For example, some information may be the same in a very large area, and can be associated with a certain SI ID; and other information may be more local, and can be associated with a different SI ID. Note that the geographic areas associated with SI ID may coincide with other planed areas in the network, e.g., a cell, a tracking area, or a location area. For such cases, an ID identifying such geographic area may be used as the SI ID, e.g., cell ID, tracking area ID, location area ID, etc.

Figure 6:
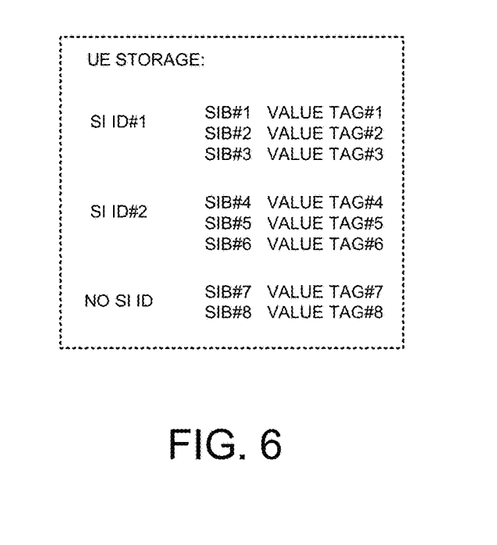
FIG. 6 illustrates a second example of UE stored system information where different SI information elements have different applicability.

FIG. 6 illustrates a second example of UE stored system information where different SI information elements have different applicability. In the example of FIG. 6, a first type of system information SIB#1, SIB#2, and SIB#3 are one kind of system information that is static over a large area and assigned to a first SI ID#1. A second type of system information SIB#4, SIB#5, and SIB#6 are another kind of system information that is more local and assigned to a second SI ID#2, where SI is likely to be the same in only a small area: list of neighbor very small cell, WLAN access points etc. For example, SI ID#2 can be derived or inferred from another ID, e.g., Cell ID, Cell Portion ID, eNodeB ID, TRP ID, Sidelink ID, or Beam ID. A third type of system information SIB#7 and SIB#8 are not associated with any SI ID, and can be used as long as the UE stays within a single cell, cell portion, TRP, eNodeB, sidelink, or beam. The third type of system information is likely to be different between different cells/TRPs/beams, thus need to be rechecked, or information that is not applicable for validity check.

Based on the three types of system information, there are three kinds of association between SI information elements and SI ID. Under a first type of association, SI is associated with a broadcasted SI ID#1; under a second type of association, SI is associated with a second SI ID#2 that is derived from another ID; under a third type of association, SI is not associated with any SI ID. The information on which SI is associated with a first SI ID#1, which SI is associated with a second SI ID#2 that is derived from another ID, and which SI is not associated with any SI ID can be: 1) indicated in broadcast, or b) hardcoded in specification.

In LTE systems, for SI validity check, UE checks whether a UE stored SI version is the same as the applicable SI version broadcasted in the current serving cell. The SI version of each cell is defined by a version number, e.g., a value tag broadcasted in each cell. Typically, when SI configuration is updated, the value tag is added by one. When entering a new cell, UE re-acquires all SI configuration along with the present value tag. If after a period of time, UE finds that the broadcasted value tag is not the same as the UE stored one, then UE knows that its stored SI version is not the latest one. UE will perform SI acquisition to keep SI updated. Further, a validity timer is started or restarted when 1) UE acquires latest SI, or 2) UE confirms stored SI as valid. If the validity timer expires, UE flushes stored SI and re-acquire the latest SI configuration. Note that a value tag may be a "global" value tag that applies to multiple SIBs, or may be a SIB-specific value tag. If the value tag is SIB-specific, then each SI information element is associated with its own value tag.

Figure 7:
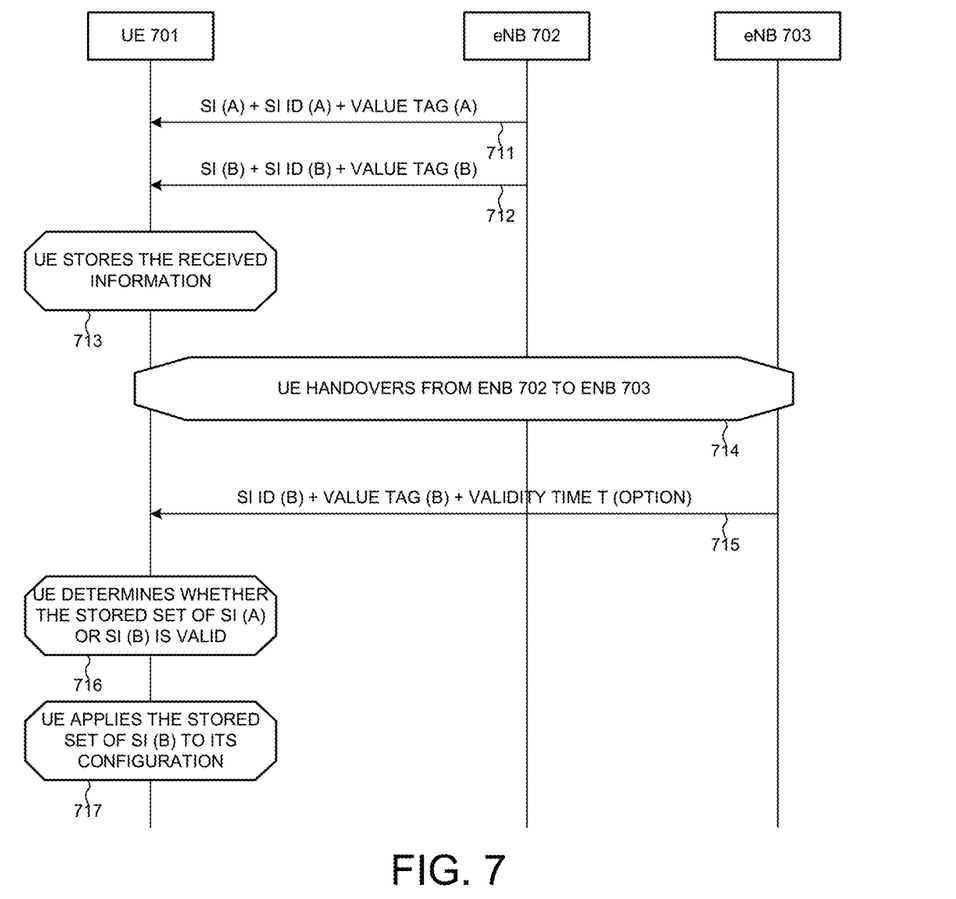
FIG. 7 illustrates one embodiment of a UE receiving and storing SI information elements and determined whether stored system information is valid for an applicable SI ID.

FIG. 7 illustrates one embodiment of a UE receiving and storing SI information elements and determined whether stored system information is valid for an applicable SI ID. In step 711, UE 701 receives a set of system information (SI (A)), its associated SI ID (A), and value tag (A) from serving eNB 702. In addition, in step 712, UE 701 also receives another set of system information (SI (B)), its associated SI ID (B), and value tag (B) from serving eNB 702. In step 713, UE 701 stores the received SI information, SI IDs, value tags, and starts a validity timer. Initially, eNB 702 is the serving base station for UE 701, the applicable SI ID is SI ID (A), and UE 701 applies SI (A) for its SI configuration. Later, in step 714, UE 701 handovers from eNB 702 to eNB 703. In step 715, UE 701 receives system information broadcasted from eNB 703. The received system information includes SI ID (B), value tag (B) and optionally a validity time T from the new serving base station eNB 703. In one example, the received SI ID(B) is indicated to be the applicable to the serving cell. In another example, the received system information includes another ID, e.g., a Cell ID, TRP ID, TAI, PLMN ID etc., from which the applicable SI ID(B) can be derived or inferred. In step 716, UE 701 determines whether the stored system information SI (A) or SI (B) is valid for the applicable SI ID (B). Assume that the validity timer for SI ID (B) has not expired, since the stored SI (B) has a matching SI ID (B) and value tag (B), UE 701 determines that the stored SI (B) is valid. Finally, in step 717, UE 701 applies the stored SI (B) to its SI configuration.

Figure 8:
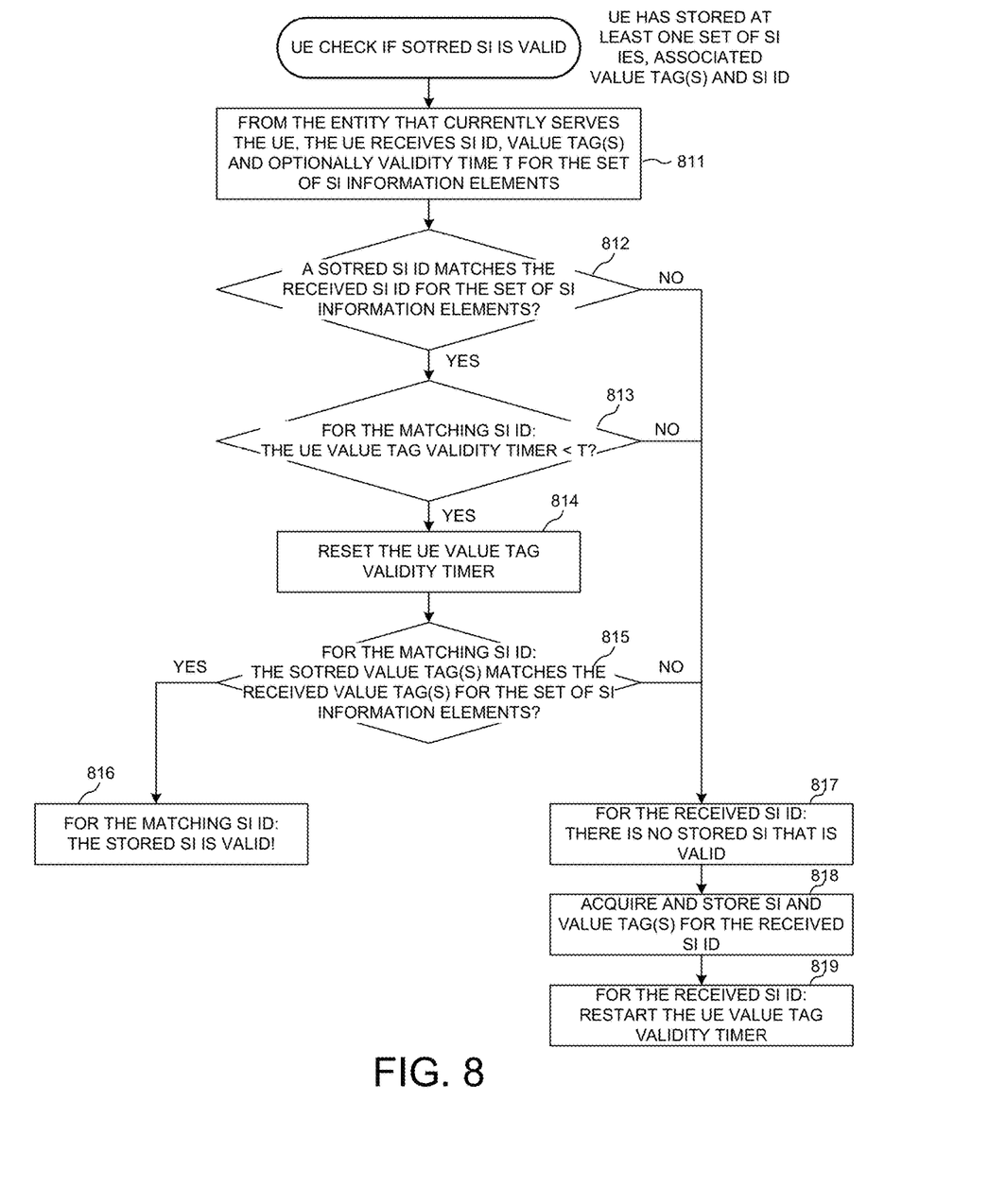
FIG. 8 illustrates a procedure for UE to determine whether stored system information is valid for an applicable SI ID.

FIG. 8 illustrates a procedure for UE to determine whether stored system information is valid for an applicable SI ID. In step 810, a UE is triggered to check if the UE stored SI is valid. It is assumed that the UE has stored at least one set of SI information elements, the value tag(s) associated with these SI information elements, and the SI ID associated with the stored set of information elements. In step 811, from the entity that currently serves the UE, the UE receives an SI ID, value tag(s) and optionally validity time T for the said set of SI information elements. The received SI ID is the applicable SI ID. Note that SI ID should only be applicable to a radio access technology (RAT) or to a public land mobile network (PLMN). The UE handles separate SI ID values for different RAT/PLMN, meaning that even if a stored SI ID value is the same as an SI ID value received by signaling, they are considered to be different if they refer to different RATs or different PLMNs. However, the UE can store SI for multiple RATs and/or multiple PLMNs. For the network sharing case, this might apply to the primary PLMN or possibly the registered PLMN. Furthermore, separate SI ID can be provided with different service/verticals, e.g., SI ID for mMTC can have larger applicable are than SI ID for eMBB.

In handling the value tag validity time, a timer need to be started in the UE when system information relating a value tag is received, and the timer needs to be restarted whenever the SI validity is checked and it passes the checked. If the timer >T, the value tag cannot be trusted, as the same value check might have positive outcome as the value tag may have wrapped around. In order to handle periods with frequent SI updates, the validity time could be shortened by transmitting the value T together with the value tag(s) in the current serving entity. Alternatively, the value T could be hardcoded in the specification.

In step 812, the UE determines whether a stored SI ID matches the received SI ID for the set of SI information elements. If the answer is yes, then in step 813, the UE determines whether the UE value tag validity timer is less than the validity time T. If the answer is yes, then in step 814, the UE restarts the UE value tag validity timer. In step 815, for the matching SI ID, the UE further determines whether the stored value tag(s) matches the received value tag(s) for the set of SI information elements. If multiple SIB-specific value tags are received, then each value tag needs to be matched for each SIB. If the answer is yes, the UE goes to step 816, and determines that the stored SI is valid for the matching SI ID. If the answer to any of the steps 812, 813, or 815 is no, then the UE goes to step 817, and determines that there is no stored SI that is valid for the received SI ID. In step 818, the UE acquires and stores SI information elements and value tag(s) for the received SI ID. In step 819, the UE restarts the UE value tag validity timer for the received SI ID.

Figure 9:
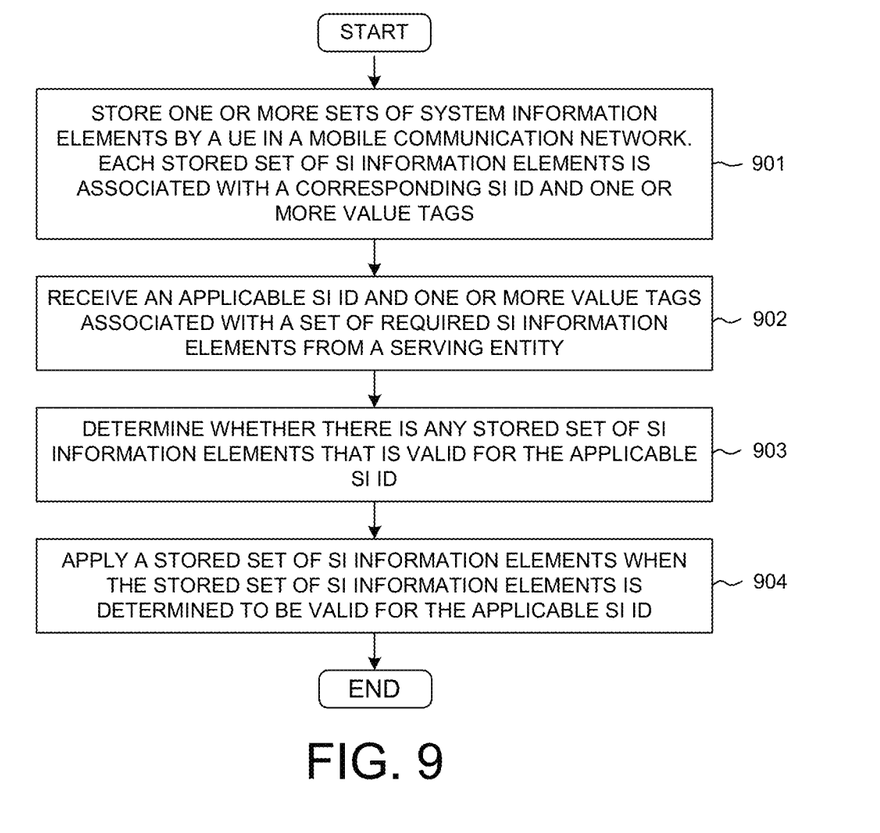
FIG. 9 is a flow chart of a method of acquiring system information with reduced signaling overhead in accordance with one novel aspect.

FIG. 9 is a flow chart of a method of acquiring system information with reduced signaling overhead in accordance with one novel aspect. In step 901, a user equipment (UE) stores one or more sets of system information (SI) information elements in a mobile communication network. Each stored set of SI information elements is associated with a corresponding stored SI ID and one or more value tags. In step 902, the UE receives an applicable SI ID and one or more value tags associated with a set of required SI information elements from a serving entity. In step 903, the UE determines whether there is any stored set of SI information elements that is valid for the applicable SI ID. In step 904, the UE applies the stored set of SI information elements when the stored set of SI information elements is determined to be valid for the applicable SI ID.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   storing one or more sets of system information (SI) information elements by a user equipment (UE) in a mobile communication network, wherein each stored set of SI information elements is associated with a corresponding stored SI ID and one or more value tags, wherein SI ID values are associated with a public land mobile network (PLMN), and wherein an SI ID indicates an SI area within a corresponding PLMN area;
   receiving an applicable SI ID and one or more value tags associated with a set of required SI information elements from a serving entity;
   determining whether there is any stored set of SI information elements that is valid for the applicable SI ID; and
   applying a stored set of SI information elements when the stored set of SI information elements is determined to be valid for the applicable SI ID.

2. The method of claim 1, wherein an SI ID refers to an area comprising a plurality of serving entities that applies the same set of SI information elements.

3. The method of claim 2, wherein the UE moves from a first serving entity to a second serving entity belonging to the area with the same SI ID without reacquiring the same set of system information elements.

4. The method of claim 1, wherein the stored set of SI information elements is determined to be valid when the stored SI ID matches the applicable SI ID and the stored one or more value tags match the received one or more value tags.

5. The method of claim 1, wherein the UE stores different versions of the same set of SI information elements associated with different SI IDs.

6. The method of claim 1, wherein the UE stores a first set of SI information element associated with a first SI ID, and wherein the UE stores a second set of SI information elements associated with a second SI ID.

7. The method of claim 6, wherein the second SI ID is derived or inferred from another ID.

8. The method of claim 1, wherein the UE stores a subset of SI information elements that is not associated with any SI ID.

9. The method of claim 1, wherein the serving entity belongs to one of a cell, a cell portion, an eNodeB, a transmission point (TRP), a sidelink, and a beam.

10. A user equipment (UE), comprising:
 memory that stores one or more sets of system information (SI) information elements in a mobile communication network, wherein each stored set of SI information elements is associated with a corresponding stored SI ID and one or more value tags, wherein SI ID values are associated with a public land mobile network (PLMN), and wherein an SI ID indicates an SI area within a corresponding PLMN area;
 a receiver that receives an applicable SI ID and one or more value tags associated with a set of required SI information elements from a serving entity;
 a system information (SI) verification circuit that determines whether there is any stored set of SI information elements that is valid for the applicable SI ID; and
 a configuration circuit that applies a stored set of SI information elements when the stored set of SI information elements is determined to be valid for the applicable SI ID.

11. The UE of claim 10, wherein an SI ID refers to an area comprising a plurality of serving entities that applies the same set of SI information elements.

12. The UE of claim 11, wherein the UE moves from a first serving entity to a second serving entity belonging to the area with the same SI ID without reacquiring the same set of system information elements.

13. The UE of claim 10, wherein the stored set of SI information elements is determined to be valid when the stored SI ID matches the applicable SI ID and the stored one or more value tags match the received one or more value tags.

14. The UE of claim 10, wherein the UE stores different versions of the same set of SI information elements associated with different SI IDs.

15. The UE of claim 10, wherein the UE stores a first set of SI information element associated with a first SI ID, and wherein the UE stores a second set of SI information elements associated with a second SI ID.

16. The UE of claim 15, wherein the second SI ID is derived or inferred from another ID.

17. The UE of claim 10, wherein the UE stores a subset of SI information elements that is not associated with any SI ID.

18. The UE of claim 10, wherein the serving entity belongs to one of a cell, a cell portion, an eNodeB, a transmission point (TRP), a sidelink, and a beam.

19. A method, comprising:
 storing one or more sets of system information (SI) information elements by a user equipment (UE) in a mobile communication network, wherein each stored set of SI information elements is associated with a corresponding stored SI ID and one or more value tags;
 receiving an applicable SI ID and one or more value tags associated with a set of required SI information elements from a serving entity;
 determining whether there is any stored set of SI information elements that is valid for the applicable SI ID; and
 applying a stored set of SI information elements when the stored set of SI information elements is determined to be valid for the applicable SI ID, wherein the UE stores a first set of SI information element associated with a first SI ID, and wherein the UE stores a second set of SI information elements associated with a second SI ID.

20. The method of claim 19, wherein an SI ID refers to an area comprising a plurality of serving entities that applies the same set of SI information elements.

* * * * *